No. 666,773. Patented Jan. 29, 1901.
P. NEU.
STEERING MECHANISM FOR VEHICLES.
(Application filed Jan. 26, 1900.)
(No Model.)
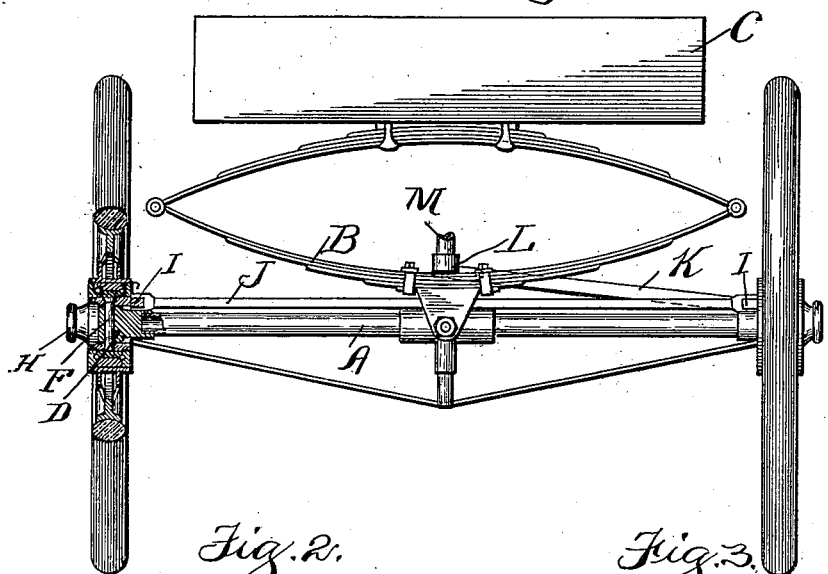
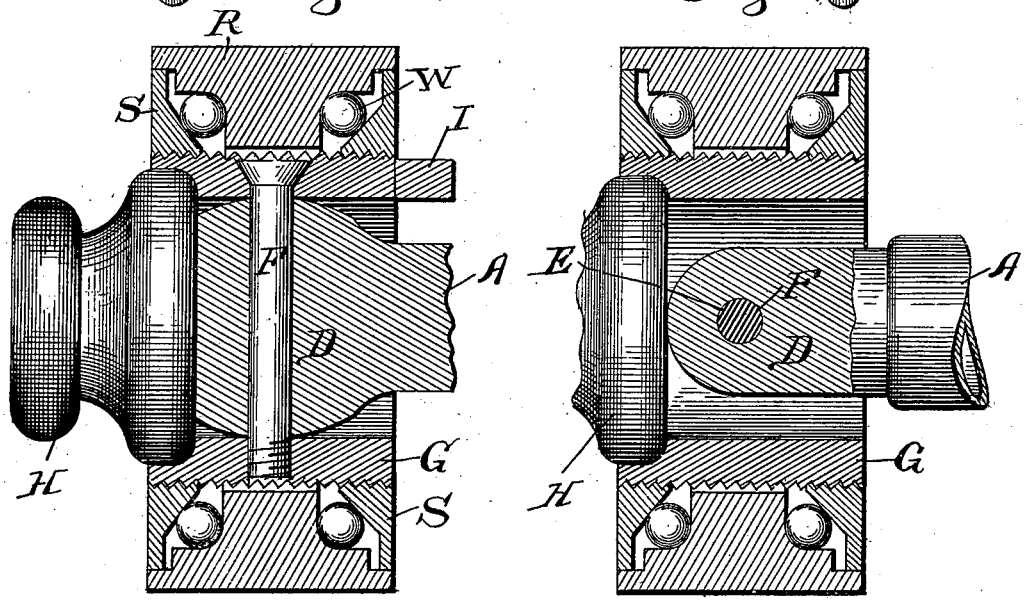
Witnesses:
J B Weir
G A Vaubenschmidt
Inventor
Philip Neu,
by Wm C Belt
Atty

UNITED STATES PATENT OFFICE.

PHILIP NEU, OF ELGIN, ILLINOIS.

STEERING MECHANISM FOR VEHICLES.

SPECIFICATION forming part of Letters Patent No. 666,773, dated January 29, 1901.

Application filed January 26, 1900. Serial No. 2,856. (No model.)

*To all whom it may concern:*

Be it known that I, PHILIP NEU, a citizen of the United States, residing at Elgin, in the county of Kane and State of Illinois, have invented certain new and useful Improvements in Steering Mechanism for Vehicles, of which the following is a specification.

My invention relates to certain new and useful improvements in steering mechanism for vehicles; and it is particularly adapted for use in connection with automobiles and similar vehicles which are steered by moving the wheels instead of moving the axle. With vehicles of this description the front wheels have been pivotally mounted on the axle in such a manner that when the wheel strikes an obstruction the jar caused thereby is communicated through the steering mechanism to the handle and the operator's hand, and it is sometimes of such force that the operator will be unable to hold the steering mechanism rigid and the wheels in their true position. In such cases the result is that the wheels are suddenly turned on their pivots and the direction of movement of the vehicle changed, thereby causing a great many accidents. It is a matter of common knowledge that a great majority of accidents with automobiles at the present time happen through the inability of the operator to control the steering mechanism and the direction of movement of the vehicle, the result being that the steering mechanism, which is steadied entirely by the operator who holds the steering-lever, is subjected to all of the strains, twists, and turns communicated to the front wheels by reason of inequalities and obstructions in the roadway.

It is one object of my invention to avoid the disadvantages of steering mechanism for vehicles now in use and to provide a steering mechanism which will not be affected by the inequalities and obstructions in the roadway.

A further object of the invention is to provide a steering mechanism for vehicles which is wholly and entirely under the control of the operator and at the same time will not be affected by inequalities and obstructions in the roadway.

Another object of the invention is to provide for mounting the front wheels on the axle of a vehicle in such a manner that they will not be turned or twisted on their pivots when they strike inequalities in the roadway and obstructions of any kind; and a still further object of this invention is to provide a pivot connection between each front wheel and the axle of a vehicle which is located in the diametrical line of the wheel, the construction being such that when the wheel strikes an obstruction it will receive the blow squarely against its pivot and not be twisted or turned, but remain in the same position.

My invention also has other objects in view which will be fully and clearly pointed out hereinafter in connection with the detailed description of the accompanying drawings, in which—

Figure 1 is a front elevation of a vehicle embodying my invention, a portion of one wheel being shown in section. Fig. 2 is a vertical sectional view showing one end of the axle and the hub. Fig. 3 is a horizontal sectional view of the parts shown in Fig. 2.

Referring to the drawings, in which like letters of reference denote corresponding parts in all of the figures, A designates the front axle of a vehicle embodying my invention, B a spring, and C a body supported on the spring. The axle is rigidly secured in position parallel with the rear axle (not shown) and preferably in such a manner that it may have a rocking or tipping movement in a vertical plane, this, however, not being an essential part of the present invention.

Each end of the axle is preferably provided with an enlargement D, having a central vertical opening E, adapted to receive a bolt F, which secures an exteriorly-threaded boss G rigidly in position on the end of the axle. This boss is in the form of a cylinder provided with an exterior thread to receive the hub R of the wheel, and the bolt F operates as a pivot-pin for securing the boss and the wheel pivotally on the end of the axle. The extreme end of the axle may be provided with a dust-guard or ornamental finishing-knob H.

On the inner edge of each boss G, I provide a rearwardly-extending arm I, which arms are connected by a rod J, and a link K connects the crank-arm L of the steering-lever M to one of said arms I, so that by turning the lever M the wheels will be simultaneously moved corresponding thereto.

A ball-bearing is provided between the hub and the boss, and the balls W are retained in place against the hub by rings S, which are screwed in place on the boss and afford a simple and effectual adjustment for the parts, besides securing the hub in proper position on the boss.

It is believed that the operation of my invention will be fully understood from the foregoing description in connection with the accompanying drawings.

Particular attention is called to the fact that each of the front wheels is pivotally secured to the front axle in a diametrical line thereof—that is to say, the pivot-pin F is located in a line passing diametrically through the center of the wheel. It will thus be observed that if one of the front wheels should strike an obstruction, whether it be a stone, a log, or a permanent fixture, such as a curb-stone or a post, it will not be turned or twisted on its pivot, because the force of the blow is directed against the periphery of the wheel and diametrically through the same and its pivot. If the pivot of the wheel were located at one side of the wheel, as is common in many automobiles as constructed at the present time, the force of the blow caused by the wheel striking an obstruction would be sufficient to turn the wheel on its pivot and thus change the direction of movement of the vehicle. In this way a great many accidents happen, as it will be understood that a sudden and unexpected change in the direction of movement of an automobile is often sufficient to turn the vehicle over, or at least tip the same to such an extent as to tip the occupants out. When the pivots of the wheels are located at one side thereof, as just described, the only way in which they can be maintained in their proper position is by holding the steering-lever rigid, and as the guiding of the vehicle depends entirely upon the movement of the steering-lever it is important that this lever should be wholly under the control of the operator; but it has been found that the operator cannot under ordinary circumstances hold the steering-lever with such rigidity as to enable him to prevent the front wheels being twisted and turned on their pivots as they pass over a rough roadway or meet obstructions. In fact, it is well known that in running over a rough roadway or a car-track it is practically impossible for the operator to hold the steering-lever in such a manner as to prevent the front wheels turning on their pivots and causing the vehicle to proceed in a zigzag path; but by my invention all of these difficulties are removed. The shocks and jars occasioned by rough roadways and obstructions and communicated through the steering mechanism to the lever in the vehicles as constructed at the present time are not felt by the operator using my improved steering mechanism. When one front wheel strikes a curbstone, the shock and jar is thrown entirely upon its pivot and taken up thereby without affecting the steering mechanism, for the obvious reason that the pivot of the wheel is located in the diametrical center thereof and the only way in which the wheel can be turned on its pivot is by twisting the same. Such a shock and jar is not communicated to the operator's hand, and he is thus enabled to manipulate the steering-lever and guide the vehicle easily and in a far better manner than with other steering mechanisms. If a front wheel should strike a solid obstruction, such as a wall or post, the result would be that the vehicle would be brought to a stop, the wheels remaining in the same position and not turned on their pivots, thus preventing the vehicle from being suddenly overbalanced and the occupants thrown out.

As hereinbefore stated, I do not limit myself in any manner to the particular construction of the ball-bearing, nor to the construction and arrangement of the other parts of the vehicle, as my invention may be applied to any vehicle, so far as I am aware, which is steered by manipulating or turning the front wheels, and while the invention is particularly adaptable to vehicles which are steered by manipulating the front wheels it will be apparent that it may be applied with equally good results to the back wheels, so that the vehicle can be steered by moving the back wheels. I therefore further reserve the right to apply the invention to the front or back wheels of a vehicle and in any suitable manner.

Having thus described my invention, what I claim, and desire to secure by Letters Patent, is—

1. The combination with an axle, of an open-ended cylindrical boss arranged thereon and provided with an exterior screw-thread, a bolt passing through the axle and boss and pivotally securing the boss in place on the axle, and a wheel-hub fastened on the boss, substantially as described.

2. The combination with an axle, of an open-ended cylindrical boss arranged on the end of said axle and provided with an exterior screw-thread, a bolt passing through the boss and axle and pivoting the boss on the axle, rings screwed on the boss at each end thereof, a wheel-hub located on the boss between said rings and ball-bearings held against the hub by said rings, substantially as described.

PHILIP NEU.

Witnesses:
    FREDERICK W. SPELZ,
    WM. O. BELT.